United States Patent
Liang et al.

[11] Patent Number: 5,944,127
[45] Date of Patent: Aug. 31, 1999

[54] HARDFACING MATERIAL FOR ROCK BITS

[75] Inventors: Dah-Ben Liang, The Woodlands; Alysia C. White, Kingwood; Zhigang Fang; Jiinjen Albert Sue, both of The Woodlands, all of Tex.

[73] Assignee: Smith International, Inc., Houston, Tex.

[21] Appl. No.: 08/851,383

[22] Filed: May 5, 1997

Related U.S. Application Data

[63] Continuation-in-part of application No. 08/597,476, Feb. 2, 1996, Pat. No. 5,715,899
[60] Provisional application No. 60/014,731, Mar. 12, 1996.

[51] Int. Cl.$^6$ .............................. B24D 3/02; E21B 10/50
[52] U.S. Cl. .............................. 175/374; 51/309; 501/87
[58] Field of Search ........................... 175/374, 411; 51/309; 75/236, 240; 428/557, 558, 559; 501/87

[56] References Cited

U.S. PATENT DOCUMENTS

| | | | |
|---|---|---|---|
| 2,833,520 | 5/1958 | Owen | 175/379 |
| 2,833,638 | 5/1958 | Owen | 51/309 |
| 3,260,579 | 7/1966 | Scales et al. | 428/557 |
| 3,768,984 | 10/1973 | Foster, Jr. | 428/558 |
| 3,800,891 | 4/1974 | White et al. | 175/374 |
| 3,823,030 | 7/1974 | Hudson | 427/190 |
| 3,882,594 | 5/1975 | Jackson et al. | 228/122.1 |
| 3,989,554 | 11/1976 | Wisler | 285/333 |
| 4,053,306 | 10/1977 | Rodriguez | 420/119 |
| 4,359,335 | 11/1982 | Garner | 419/6 |
| 4,694,918 | 9/1987 | Hall | 175/430 |
| 4,705,123 | 11/1987 | Dennis | 175/428 |
| 4,705,124 | 11/1987 | Abrahamson et al. | 175/426 |
| 4,719,076 | 1/1988 | Geczy et al. | 419/8 |
| 4,726,432 | 2/1988 | Scott et al. | 175/375 |
| 4,836,307 | 6/1989 | Keshavan et al. | 175/374 |
| 4,944,774 | 7/1990 | Keshavan et al. | 175/374 |
| 5,051,112 | 9/1991 | Keshavan et al. | 51/309 |
| 5,492,186 | 2/1996 | Overstreet et al. | 175/374 |

FOREIGN PATENT DOCUMENTS

| | | |
|---|---|---|
| 0288775 | 11/1988 | European Pat. Off. . |
| 1558979 | 10/1967 | Germany . |
| 8702711 | 5/1987 | WIPO . |
| 8804649 | 6/1988 | WIPO . |

OTHER PUBLICATIONS

"Ultra–Hard Wear Parts," by Dieter F. Bruschek, et al., The Carbide and Tool Journal, Mar.–Apr. 1986, pp. 14–17.

*Primary Examiner*—David J. Bagnell
*Attorney, Agent, or Firm*—Christie, Parker & Hale, LLP

[57] ABSTRACT

A hardfacing material for shirttail and gage surfaces of a rock bit cone and a gage row of rock bit teeth comprises steel in the range of from 20 to 40 percent by weight, and tungsten carbide particles in the range of from 60 to 80 percent by weight which contains single crystal monotungsten carbide particles having a particle size primarily less than about 200 mesh with a preferred average particle size in the range of from 30 to 70 microns. According to further embodiments, carburized tungsten carbide particles and/or spherical cast carbide particles are mixed with the single crystal monotungsten carbide in the hardfacing. The carburized tungsten carbide particles have a particle size in the range of from about 10 to 50 microns. The spherical cast tungsten carbide particles have a particle size in the range of from about 20 to 150 microns. The particle size distributions of the tungsten carbide particles are bimodal or trimodal for improved weldability and wear resistance in the hardfacing.

24 Claims, 1 Drawing Sheet

HARDFACING MATERIAL FOR ROCK BITS

CROSS-REFERENCE TO RELATED APPLICATIONS

This application is a continuation-in-part of U.S. patent application Ser. No. 08/597,476, filed Feb. 2, 1996, now U.S. Pat. No. 5,715,899, the disclosure of which is hereby incorporated by reference, and Ser. No. 60/014,731, filed Mar. 12, 1997, the disclosure of which is also hereby incorporated by reference.

BACKGROUND OF THE INVENTION

This invention relates to improved wear-resistant hardfacing compositions applied to wear surfaces on teeth and gage surfaces on bits for drilling oil wells or the like.

Bits for drilling oil wells and the like commonly have a steel body which is connected at the bottom of a drill string. Steel cutter cones are mounted on the body for rotation and engagement with the bottom of a hole being drilled to crush, gouge, and scrape rock for drilling the well. One important type of rock bit referred to as a milled tooth bit has roughly trapezoidal teeth protruding from the surface of the cone for engaging the rock. The principal faces of such a milled tooth that engage the rock are usually dressed with a layer of hardfacing material to resist wear. The specific tooth geometry forms no part of this invention.

Conventional hardfacing usually comprises particles of tungsten carbide bonded to the steel teeth by a metal alloy. In effect, the carbide particles are suspended in a matrix of metal forming a layer on the surface. Most hardfacing on rock bits employs steel as the matrix, although other alloys may also be used.

It is quite common in referring to the material in the hardfacing merely as "carbide" without characterizing it as tungsten carbide. The metal carbide principally used in hardfacing is tungsten carbide. Small amounts of tantalum carbide and titanium carbide may be present, although considered to be deleterious. It will be understood that as used herein, reference merely to "carbide" means tungsten carbide.

A typical technique for applying hardfacing to the teeth on a rock bit is by oxyacetylene or atomic hydrogen welding. A welding "rod" or stick is formed of a tube of mild steel sheet enclosing a filler which is primarily carbide particles. The filler may also include deoxidizer for the steel, flux and a resin binder. The hardfacing is applied by melting an end of the rod on the face of the tooth. The steel tube melts to weld to the steel tooth and provide the matrix for the carbide particles in the tube. The deoxidizer alloys with the mild steel of the tube. face of the tooth. The steel tube melts to weld to the steel tooth and provide the matrix for the carbide particles in the tube. The deoxidizer alloys with the mild steel of the tube.

Three types of tungsten carbide have been employed for hardfacing. Possibly the most common is crushed cast carbide. Tungsten forms two carbides, WC and $W_2C$ and there can be an essentially continuous range of compositions therebetween. Cast carbide is typically a eutectic mixture of the WC and $W_2C$ compounds, and as such is substoichiometric, that is, it has less carbon than the more desirable WC form of tungsten carbide. Cast carbide is frozen from the molten state and comminuted to the desired particle size.

Another type of tungsten carbide is single crystal monotungsten carbide, or so-called macrocrystalline tungsten carbide. This material is essentially stoichiometric WC in the form of single crystals. Most of the macrocrystalline tungsten carbide is in the form of single crystals. When larger particle sizes are examined, it is found that some bicrystals of WC are formed. Single crystal WC is desirable for its toughness and stability.

The third type of tungsten carbide used in hardfacing comprises cemented tungsten carbide, sometimes referred to as sintered tungsten carbide. Cemented tungsten carbide comprises small particles of tungsten carbide (e.g., 1 to 15 microns) bonded together with cobalt. Cemented tungsten carbide is made by mixing tungsten carbide and cobalt powders, pressing the mixed powders to form a green compact, and "sintering" the composite at temperatures near the melting point of cobalt. The resulting dense cemented carbide can then be comminuted to form particles of cemented tungsten carbide for use in hardfacing.

Although mild steel sheet is used when forming the tubes, the steel in the hardfacing as applied to a rock bit is a hard, wear resistant, alloy steel. This occurs by reason of deoxidizers such as silicon and manganese mixed in the filler in the tube and dissolution of tungsten, carbon, and possibly cobalt, from the tungsten carbide during welding. There may also be some mixing with alloy steel from the teeth on the cone.

It is important to provide as much wear resistance as possible on the teeth of a rock bit cutter cone. The effective life of the cone is enhanced as wear resistance is increased. It is desirable to keep the teeth protruding as far as possible from the body of the cone since the rate of penetration of the bit into the rock formation is enhanced by longer teeth (however, unlimited length is infeasible since teeth may break if too long for a given rock formation). As wear occurs on the teeth, they get shorter and the drill bit may be replaced when the rate of penetration decreases to an unacceptable level. It is desirable to minimize wear so that the footage drilled by each bit is maximized. This not only decreases direct cost, but also decreases the frequency of having to "round trip" a drill string to replace a worn bit with a new one.

Due to the unique wear encountered on the gage surfaces of the cone and teeth along the hole wall, it is desired that an improved hardfacing material be developed for use in providing improved wear resistance and abrasion protection for such gage surfaces, and for other non-gage teeth surfaces as well. As gage teeth and gage surfaces wear, the diameter of the hole drilled by the bit may decrease, sometimes causing drilling problems or requiring "reaming" of the hole by the next bit used. Advances in wear resistance of hardfacing are desirable to increase the duration during which a hole diameter (or gage) can be maintained, to enhance the footage a drill bit can drill before becoming dull, and to enhance the rate of penetration of such drill bits. Such improvements translate directly into reduction of drilling expense.

SUMMARY OF THE INVENTION

There is, therefore, provided in practice of this invention according to a presently preferred embodiment, hardfacing materials for a shirttail and gage surfaces of a rock bit cone and a gage row of rock bit teeth. The improved hardfacing for the shirttail and gage surfaces of the cone and gage row teeth comprises steel in the range of from 20 to 40 percent by weight, and tungsten carbide particles in the range of from 60 to 80 percent by weight comprising single crystal monotungsten carbide particles having a particle size primarily less than about 200 mesh (−74 microns) with a preferred average particle size in the range of from 30 to 70 microns.

Further embodiments include hardfacing materials having bimodal and trimodal carbide particle distributions of single crystal monotungsten carbide particles mixed with carburized tungsten carbide particles and/or spherical cast carbide particles. The carburized tungsten carbide particles have an average particle size in the range of from about 10 to 50 microns. The spherical cast tungsten carbide particles have an average particle size in the range of from about 20 to 150 microns.

DESCRIPTION OF THE DRAWINGS

These and other features and advantages of the present invention will be appreciated as the same becomes better understood by reference to the following detailed description when considered in connection with the accompanying drawings wherein.

DETAILED DESCRIPTION OF THE INVENTION

Figure 1:
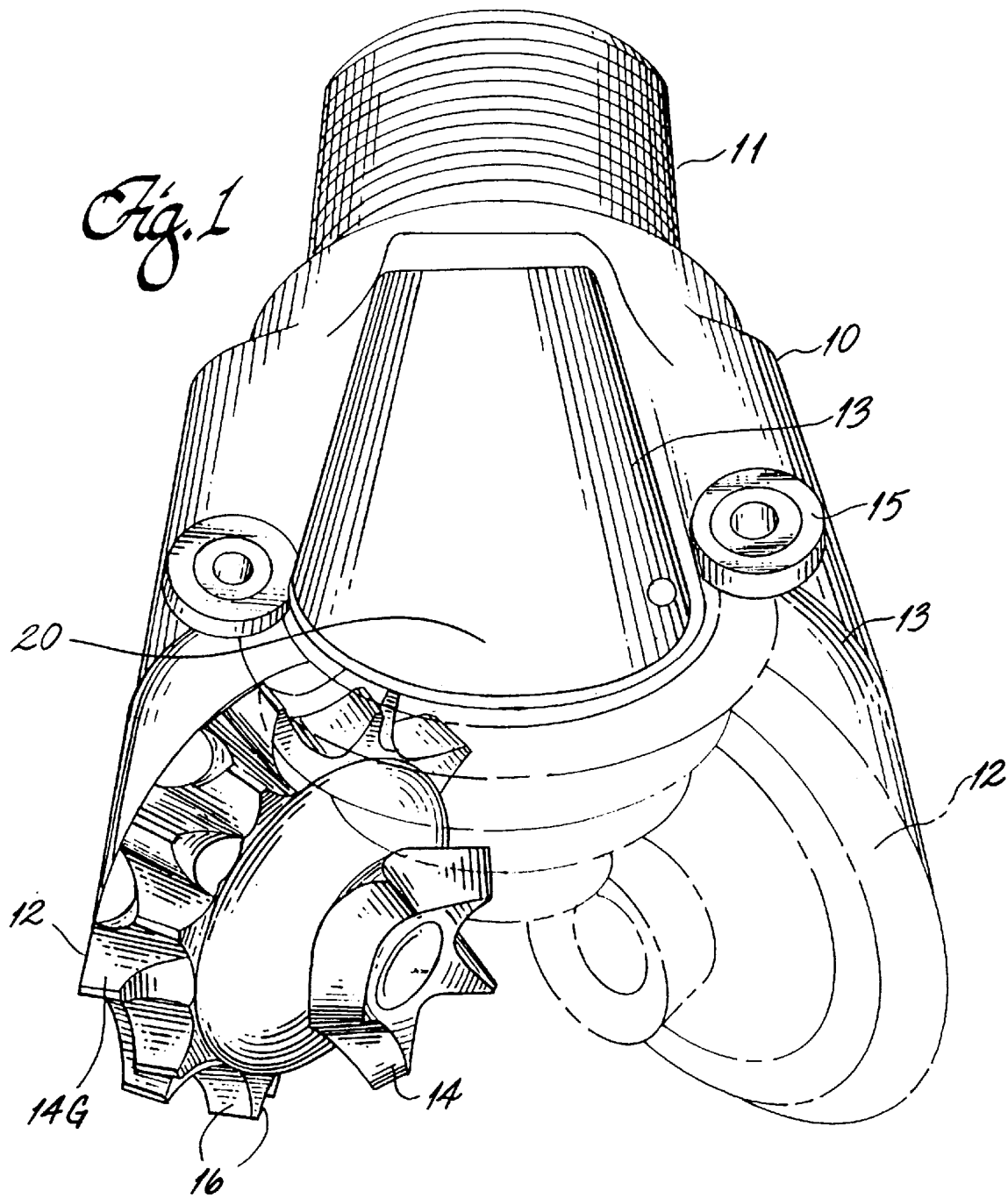
FIG. 1 is a perspective view of a milled tooth rock bit constructed according to principles of this invention.
Figure 2:
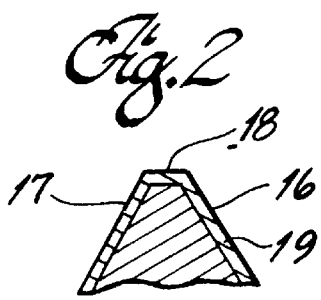
FIG. 2 is a fragmentary cross section of an exemplary tooth on such a rock bit.

An exemplary milled tooth rock bit comprises a stout steel body 10 having a threaded pin 11 at one end for connection to a conventional drill string. At the opposite end of the body there are three cutter cones 12 for drilling rock for forming an oil well or the like. Each of the cutter cones is rotatably mounted on a pin (hidden) extending diagonally inwardly on one of the three legs 13 extending downwardly from the body of the rock bit. As the rock bit is rotated by the drill string to which it is attached, the cutter cones effectively roll on the bottom of the hole being drilled. The cones are shaped and mounted so that as they roll, teeth 14 on the cones gouge, chip, crush, abrade, and/or erode the rock at the bottom of the hole. The teeth 14G in the row around the heel of the cone are referred to as the gage row teeth. They engage the bottom of the hole being drilled near its perimeter on "gage."

Fluid nozzles 15 direct drilling mud into the hole to carry away the particles of rock created by the drilling.

Such a rock bit is conventional and merely typical of various arrangements that may be employed in a rock bit. For example, most rock bits are of the three cone variety illustrated. However, one, two and four cone bits are also known. The arrangement of teeth on the cones is just one of many possible variations. In fact, it is typical that the teeth on the three cones on a rock bit differ from each other so that different portions of the bottom of the hole are engaged by the three cutter cones so that collectively the entire bottom of the hole is drilled. A broad variety of tooth and cone geometries are known and do not form a specific part of this invention.

Exemplary teeth on such a cone are generally trapezoidal in a cross-section taken in a radial plane of the cone. Such a tooth has a leading flank 16 and trailing flank 17 meeting in an elongated crest 18. The flanks of the teeth are covered with a hardfacing layer 19. Sometimes only the leading face of each tooth is covered with a hardfacing layer so that differential erosion between the wear-resistant hardfacing on the front flank of a tooth and the less wear-resistant steel on the trailing face of the tooth tends to keep the crest of the tooth relatively sharp for enhanced penetration of the rock being drilled.

The leading face of the tooth is the face that tends to bear against the undrilled rock as the rock bit is rotated in the hole. Because of the various cone angles of teeth on a cutter cone relative to the angle of the pin on which the cone is mounted, the leading flank on the teeth in one row on the same cone may face in the direction of rotation of the bit, whereas the leading flank on teeth in another row may, on the same cone, face away from the direction of rotation of the bit. In other cases, particularly near the axis of the bit, neither flank can be uniformly regarded as the leading flank and both flanks may be provided with a hardfacing.

There are also times when the ends of a tooth, that is, the portions facing in more or less an axial direction on the cone, are also provided with a layer of hardfacing. This is particularly true on the so-called gage surface of the bit which is virtually always provided with a hardfacing. The gage surface is a generally conical surface at the heel of a cone which engages the side wall of a hole as the bit is used. The gage surface includes the outer end of teeth 14G in the so-called gage row of teeth nearest the heel of the cone and may include additional area nearer the axis of the cone than the root between the teeth. The gage surface is not considered to include the leading and trailing flanks of the gage row teeth. The gage surface encounters the side wall of the hole in a complex scraping motion which induces wear of the gage surface. In some embodiments, hardfacing may also be applied on the shirttail 20 at the bottom of each leg on the bit body.

Such structure of a milled tooth rock bit is well known and does not form a specific portion of this invention, which relates to the specific hardfacing material employed on the teeth of a milled tooth cutter cone.

According to a presently preferred embodiment of the invention, the hardfacing material comprises a mixture of fine particles having a bimodal size distribution, preferably comprising relatively larger single crystal monotungsten carbide particles mixed with smaller carburized tungsten carbide particles. Such hardfacing materials are especially well suited for use on the shirttail, gage, surfaces and gage row teeth of a rock bit.

Preferably, the tungsten carbide component of the hardfacing material consists essentially of particles having a particle size below 200 mesh (−74 microns). However, it is to be understood that a hardfacing material according to preferred embodiments of the invention may tolerate a minor fraction of carbide particles larger than 200 mesh without departing from the scope of the invention.

Single crystal monotungsten carbide is essentially stoichiometric WC in the form of single crystals. One way to manufacture single crystal monotungsten carbide is via a high temperature thermit process during which ore concentrate is converted directly to WC. Single crystal monotungsten carbide may be grown in crystals ranging from 1 micron to 5 millimeters. These crystals are fully carburized and have isotropic properties. Single crystal WC in coarse mesh sizes is employed as the hard phase component of hardfacing materials whereas finer sizes are used to improve the abrasion wear resistance of the metal binder in the hardfacing. The single crystal WC is also known as macrocrystalline tungsten carbide and is commercially available from Kennametal, Inc., Fallon, Nev.

Carburized tungsten carbide particles may be formed by a process in which fine tungsten particles are carburized to produce a tungsten carbide powder. Carburized tungsten carbide can be manufactured from ammonium paratungstate (APT) by first converting it to blue oxide, then hydrogen-reducing to form tungsten metal, and finally carburizing to form tungsten carbide. Carburized tungsten carbide is composed of multicrystalline aggregates which may be soft and fluffy, crumb-like, and contain clusters of individual carbide particles in the 1 to 15 micron size range. Carburized tungsten carbide particles are typically mixed with cobalt and cemented into pellets, often referred to as "sintered" tungsten carbide pellets, which are typically used as a hard phase component of hardfacing materials.

Preferably, a high grade carburized tungsten carbide powder is used. Such high grade powders have low levels of impurities such as nitrogen and oxygen. A suitable powder containing high grade carburized tungsten carbide powders is WC-50 powder available from Rogers Tool Works, Inc., Rogers, Ark. This powder has an average particle size range of about 15–25 microns and maximum impurity limits of 1000 parts per million (ppm) nitrogen and 500 ppm oxygen.

Hardfacing is typically applied to the teeth and gage surface by welding with a "rod" in the form of a mild steel tube containing filler material comprising the particles of tungsten carbide. However, it is to be understood within the scope of this invention that methods other than that specifically described can be used to apply the hardfacing material of this invention. For example, the welding rod may be a unitary rod consisting of a substantially homogenous mixture of steel and filler material.

A certain minimum amount of tungsten carbide particles are necessary to harden and provide wear resistance to the metal binder. However, too much tungsten carbide in the weld rod will not produce good welds. Therefore, a desired composition of the weld rod is steel in the range of about 20 to 40 percent by weight and tungsten carbide particles in the range of about 60 to 80 percent.

In addition to the carbide in the filler in the tube, it is desirable to include up to about six percent by weight of deoxidizer and temporary resin binder. A suitable deoxidizer is silico-manganese obtained from Chemalloy in Pennsylvania. The nominal composition of the silico-manganese is 65% to 68% manganese, 15% to 18% silicon, a maximum of 2% carbon, a maximum of 0.05% sulfur, a maximum of 0.35% phosphorus, and a balance of iron. Preferably about four to six percent deoxidizer is used. A small amount of thermoset resin is desirable for partially holding the particles together in the tube so that they do not simply fall out during welding. A half percent is adequate.

In a presently preferred embodiment, the hardfacing incorporates a bimodal particle size distribution of single crystal monotungsten carbide particles having an average particle size of about 50 microns and carburized tungsten carbide having an average particle size of about 20 microns.

Rock bits incorporating hardfacing according to this embodiment have been found to provide several advantages over hardfacing materials incorporating only a single crystal WC mode. These advantages include improved wear resistance due to less preferential wear of the metal binder that lies between the single crystal WC particles in the matrix, and improved weldability with decreased porosity at the weld.

Specifically, the weldability of two exemplary hardfacing materials, Example A and Example B, were compared. Both contain 70% by weight tungsten carbide particles and 30% by weight steel. However, the carbide component of Example A consisted exclusively of single crystal WC particles having an average particle size of about 50 microns, whereas that of Example B, constructed according to the preferred embodiment, contained 25% by weight carburized tungsten carbide particles having an average particle size of about 20 microns and 75% by weight single crystal WC particles having an average particle size of about 50 microns.

The following chart describes the porosity in terms of number of pores in weld tabs (1 inch by 3 inches) on the two exemplary hardfacings and illustrates the improved weld characteristics possible with the hardfacing of the preferred embodiment:

| Pore Diameter | Example A (3 in.$^2$) | Example B (Preferred) (3 in.$^2$) |
|---|---|---|
| 1/16" to 1/8" | 6 | 0 |
| 1/32" to 1/16" | 9 | 2 |
| 1/32" and smaller | 7 | 5 |

By mixing particles of different sizes in the hardfacing, higher packing densities of particles in hardfacing materials can be obtained at the same volume fraction of particles. For example, the addition of smaller particles in the hardfacing fills the interparticle voids previously present between the larger particles of the single mode hardfacing material. Thus, the bimodal and trimodal particle size distributions of the present invention result in hardfacing materials having a higher packing density of tungsten carbide particles than single mode hardfacing materials. It is believed that this higher packing density in the hardfacing according to the invention accounts for many of the advantages over hardfacing materials which incorporate only a single mode of fine single crystal WC particles.

A higher packing density provides a shorter mean distance between particles in the hardfacing, with more of the smaller carburized tungsten carbide particles filling the space between the relatively larger single WC particles, thereby strengthening and improving wear resistance of the binder phase in between larger single crystal WC particles. Consequentially, overall wear resistance of the hardfacing is also improved.

It is desirable to have a hardfacing material which has a low viscosity during welding. Generally, a viscosity of the molten steel/solid tungsten carbide mixture during welding is dependent on the inverse of the carbide particle size, because smaller particles inherently have more surface area and inter-particle friction. However, the viscosity of a bimodal mixture of different particle sizes can be lower than that of the single mode. In principle, the higher the packing density of a mixture at any given constant solid loading, the lower the viscosity of that mixture. The bimodal carbide particle size distribution according to the preferred embodiment of this invention offers lower viscosity during welding as compared to a single mode carbide particle size distribution used in prior art hardfacing materials.

In one embodiment, the filler comprises in the range of from 65 to 85 percent by weight single crystal monotungsten carbide particles, in the range of from 4 to 6 percent by weight deoxidizer and a remainder of carburized tungsten carbide particles. An exemplary filler composition can be made up using 75 kg of 200 to 325 mesh (+44 to −74 microns) single crystal monotungsten carbide, 19 kg of carburized tungsten carbide particles having a particle size in the range of from 15 to 50 microns, 5.5 kg of silico-manganese deoxidizer, and 0.5 kg of phenolic resin binder. The particles are coated with the resin suspended in an alcohol solution which is then dried. After the tubes are loaded with the filler and the ends crimped, the ends are dipped in a solution of phenolic resin in alcohol to add some binder at the ends. The binder is then heat cured to temporarily bind the particles together.

In a further embodiment, the hardfacing comprises a bimodal particle size distribution of carburized tungsten carbide particles alone. H. C. Stark produces a line of carburized tungsten powders having a range of particle sizes, for example, MAS 3000–5000 powder which includes particles having average particle sizes between about 30 and 50 microns. In an exemplary embodiment, the hardfacing has a tungsten carbide component comprising 75 percent by weight carburized tungsten carbide particles having an average particle size of about 50 microns and 25 percent by weight carburized tungsten carbide particles having an average particle size of about 20 microns. In an analogous alternate embodiment, the hardfacing comprises a bimodal distribution of single crystal monotungsten carbide particles alone.

Spherical cast carbide particles have been found to be very tough and hard, testing up to 3000 Hardness Vickers, and have been shown to improve wear resistance in hardfacing materials. Processes for producing spherical cast carbide particles are described in U.S. Pat. Nos. 4,723,996 and 5,089,182, which are herein incorporated by reference. Basically, a mixture of tungsten and carbon is heated above its melting point into a constantly flowing stream which is poured onto a rotating cooling surface, typically a water-cooled casting cone, pipe, or concave turntable. The molten stream is rapidly cooled on the rotating surface and forms spherical particles of eutectic tungsten carbide.

In another embodiment, the tube rod filler comprises in the range of from 20 to 30 percent by weight single crystal monotungsten carbide particles, in the range of from 50 to 70 percent by weight spherical cast carbide particles, up to about 20 percent by weight carburized tungsten carbide particles, and in the range of from 4 to 6 percent by weight deoxidizer. An exemplary filler composition according to this embodiment can be made up using 25 kg of 200 to 325 mesh (+44 to −74 microns) single crystal monotungsten carbide, 70 kg of spherical cast tungsten carbide particles having a particle size in the range of from 75 to 150 microns, 4.5 kg of silico-manganese deoxidizer, and 0.5 kg of phenolic resin binder.

Another exemplary filler composition according to this embodiment can be made up using 30 kg of 200 to 325 mesh (+44 to −74 microns) single crystal monotungsten carbide, 50 kg of spherical cast tungsten carbide particles having a particle size in the range of from 75 to 150 microns, 15 kg of carburized tungsten carbide particles having a particles size in the range of from 15 to 50 microns, 4.5 kg of silico-manganese deoxidizer, and 0.5 kg of phenolic resin binder.

In an exemplary embodiment, to obtain a weight ratio of filler to steel of 70:30, a 5/32 inch (4 mm) diameter tube is made with steel sheet having a thickness of 0.017 inch (0.43 mm). Roughly the same proportions are obtained in a 3/16 inch (4.5 mm) diameter tube by making it with steel sheet 0.02 inch (0.5 mm) thick.

The hardfacing material is applied to the faces of the tooth by heating the face to a welding temperature by an oxy-acetylene or atomic hydrogen torch. When a suitable temperature is reached, the above-described tubular welding "rod" is melted onto the face of the tooth. The addition of the carburized tungsten carbide particles and the bimodal particle size distribution have been shown to improve the weldability and reduce porosity of this type of hardfacing material.

In an exemplary embodiment, the thickness of the hardfacing layer is about 1/16 to 1/8 inch (1.6 to 3.2 mm). Dissolution of the silico-manganese in the mild steel of the tube, possible dissolution of some of the tungsten and carbon of the carbides, and mixing of metal from the body of the cutter cone results in an alloy steel matrix for the carbide particles.

The proportion of carbide in the hardfacing is determined largely by the proportion in the welding "rod" used for applying the hardfacing. Some dilution may occur by alloy steel from the surface of the tooth on the cutter cone. This dilution is not a large contributor since in a typical application of hardfacing to a milled tooth cutter cone for a rock bit, the thickness of hardfacing is in the order of 3 mm. The amount of dilution depends to some extent on the technique employed by the welder applying the hardfacing.

The carbide content in the hardfacing can be estimated by metallographic examination of a cross section through the hardfacing. The approximate areas of the carbide and binder phases can be determined. From this, the volume percentages of binder and carbide can be estimated, and in turn the weight percentages. Since use of deoxidizer in the filler of a welding tube is essential to reducing porosity in the binder phase, the dilution of the carbide filler can be taken into account and the ratio of filler weight to tube weight approximated. A hypothetical tube type welding rod can be projected from a hardfacing deposited on the surface by other techniques.

The improved hardfacing provided in practice of this invention is more wear-resistant on the gage surfaces of the cone and gage row teeth of milled tooth cutters than hardfacings employing cemented or cast tungsten carbide particles, mixtures of such particles with single crystal WC particles, or single crystal WC particles having particle sizes above about 200 mesh (−74 microns).

The improvement in performance of the improved hardfacing is believed due to the contribution of the fine particle size of the single crystal WC particles to form a hardfacing surface having a fine grain structure that is highly wear/abrasion resistant. Another mechanism for the improved wear resistance of the hardfacing is dispersion strengthening of the steel matrix by the fine single crystal monotungsten carbide and/or carburized tungsten carbide.

It is desired that the improved hardfacing material be used on the shirttail, gage surfaces of the cone and gage row teeth, to provide improved resistance against the aggressive wear and abrasion caused by continuous rubbing against the hole wall. However, it is to be understood that the improved hardfacing material can be used on non-gage surfaces of the cone and cone teeth, including inner row teeth, depending on such factors as the nature of the subterranean material, drilling conditions, and the nature of hole being drilled.

Other modifications and variations of hardfacing for a rock bit will be apparent to one skilled in the art. It is, therefore, to be understood that within the scope of the appended claims, this invention may be practiced otherwise than as specifically described.

We claim:

1. A rock bit hardfacing comprising:
   steel in the range of from 20 to 40 percent by weight; and
   tungsten carbide particles in the range of from 60 to 80 percent by weight consisting essentially of single crystal monotungsten carbide particles having a particle size primarily less than 200 mesh.

2. A rock bit hardfacing comprising:
   steel in the range of from 20 to 40 percent by weight; and tungsten carbide particles in the range of from 60 to 80 percent by weight, the tungsten carbide particles comprising:
single crystal monotungsten carbide particles having a particle size primarily less than 200 mesh; and
carburized tungsten carbide particles having a particle size in the range of from 10 to 50 microns.

3. A rock bit comprising:
a rock bit body;
at least one cutting cone rotatably mounted to an end of the body, wherein the cone includes a gage surface at a heel portion of the cone; and
a number of teeth on the cone, wherein the teeth include gage row teeth located near a heel of each cone, wherein the gage surface of the cone and at least an outer end of the gage row teeth include the rock bit hardfacing as recited in claim 2.

4. A rock bit hardfacing as recited in claim 2 wherein the single crystal monotungsten carbide particles have a particle size in the range of from 30 to 70 microns.

5. A rock bit hardfacing as recited in claim 2 wherein the tungsten carbide particles comprise at least a bimodal particle size distribution.

6. A rock bit hardfacing as recited in claim 2 wherein the tungsten carbide particles comprise in the range of from about 65 to 85 percent by weight single crystal monotungsten carbide particles and a remainder of carburized tungsten carbide.

7. A rock bit hardfacing as recited in claim 6 wherein the tungsten carbide particles comprise about 75 percent by weight single crystal monotungsten carbide particles and about 25 percent by weight carburized tungsten carbide particles.

8. A rock bit hardfacing comprising:
steel in the range of from 20 to 40 percent by weight; and
tungsten carbide particles in the range of from 60 to 80 percent by weight, the tungsten carbide particles comprising:
single crystal monotungsten carbide particles having a particle size primarily less than 200 mesh;
spherical cast carbide particles having a particle size in the range of from 20 to 150 microns; and
carburized tungsten carbide particles having a particle size in the range of from 10 to 50 microns.

9. A rock bit comprising:
a rock bit body;
at least one cutting cone rotatably mounted to an end of the body, wherein the cone includes a gage surface at a heel portion of the cone; and
a number of teeth on the cone, wherein the teeth include gage row teeth located near a heel of each cone, wherein the gage surface of the cone and at least an outer end of the gage row teeth include the rock bit hardfacing as recited in claim 8.

10. A rock bit hardfacing as recited in claim 8 wherein the single crystal monotungsten carbide particles have a particle size in the range of from 30 to 70 microns.

11. A rock bit hardfacing as recited in claim 8 wherein the spherical cast carbide particles have an average particle size in the range of from 75 to 150 microns.

12. A rock bit hardfacing as recited in claim 8 wherein the tungsten carbide particles comprise a trimodal particle size distribution.

13. A rock bit hardfacing as recited in claim 8 wherein the tungsten carbide particles comprise:
about 30 percent by weight single crystal monotungsten carbide particles having an average particle size in the range of from 30 to 70 microns;
about 50 percent by weight spherical cast carbide particles having a particle size in the range of from about 75 to 150 microns; and
about 15 percent by weight carburized carbide particles.

14. A rock bit comprising:
a rock bit body;
at least one cutting cone rotatably mounted to an end of the body, wherein the cone includes a gage surface at a heel portion of the cone; and
a number of teeth on the cone, wherein the teeth include gage row teeth located near a heel of each cone, wherein the gage surface of the cone and at least an outer end of the gage row teeth include the rock bit hardfacing comprising:
steel in the range of from 20 to 40 percent by weight; and
tungsten carbide particles in the range of from 60 to 80 percent by weight consisting essentially of single crystal monotungsten carbide particles having a particle size primarily less than 200 mesh.

15. A rock bit comprising:
a rock bit body;
at least one cutting cone rotatably mounted to an end of the body, wherein the cone includes a gage surface at a heel portion of the cone;
a number of teeth on the cone, wherein the teeth include gage row teeth located near a heel of each cone, wherein the gage surface of the cone and at least an outer end of the gage row teeth include the rock bit hardfacing comprising:
steel in the range of from 20 to 40 percent by weight; and
tungsten carbide particles in the range of from 60 to 80 percent by weight, the tungsten carbide particles comprising:
single crystal monotungsten carbide particles having a particle size primarily less than 200 mesh; and
carburized tungsten carbide particles having a particle size in the range of from 10 to 50 microns.

16. A rock bit comprising:
a rock bit body;
at least one cutting cone rotatably mounted to an end of the body, wherein the cone includes a gage surface at a heel portion of the cone;
a number of teeth on the cone, wherein the teeth include gage row teeth located near a heel of each cone, wherein the gage surface of the cone and at least an outer end of the gage row teeth include the rock bit hardfacing comprising:
steel in the range of from 20 to 40 percent by weight; and
tungsten carbide particles in the range of from 60 to 80 percent by weight, the tungsten carbide particles comprising:
single crystal monotungsten carbide particles having an average particle size primarily less than 200 mesh;
spherical cast carbide particles having a particle size in the range of from about 20 to 150 microns; and
carburized carbide particles having a particle size in the range of from about 10 to 50 microns.

17. A rock bit hardfacing comprising:
steel in the range of from 20 to 40 percent by weight; and
tungsten carbide particles in the range of from 60 to 80 percent by weight consisting essentially of carburized tungsten carbide particles having a particle size primarily less than 70 microns.

18. A rock bit hardfacing as recited in claim 17 wherein the carburized tungsten carbide particles have a particle size in the range of from 10 to 70 microns.

19. A rock bit hardfacing comprising:
   steel in the range of from 20 to 40 percent by weight; and
   tungsten carbide particles in the range of from 60 to 80 percent by weight, the tungsten carbide particles comprising:
      carburized tungsten carbide particles having an average particle size of about 50 microns; and
      carburized tungsten carbide particles having an average particle size of about 20 microns.

20. A rock bit comprising:
   a rock bit body;
   at least one cutting cone rotatably mounted to an end of the body, wherein the cone includes a gage surface at a heel portion of the cone; and
   a number of teeth on the cone, wherein the teeth include gage row teeth located near a heel of each cone, wherein the gage surface of the cone and at least an outer end of the gage row teeth include the rock bit hardfacing as recited in claim 19.

21. A rock bit hardfacing as recited in claim 19 wherein the tungsten carbide particles comprise at least a bimodal particle size distribution.

22. A rock bit hardfacing as recited in claim 19 wherein the tungsten carbide particles comprise in the range of from about 65 to 85 percent by weight carburized tungsten carbide particles having an average particle size of about 50 microns and a remainder of carburized tungsten carbide particles having an average particle size of about 20 microns.

23. A rock bit hardfacing as recited in claim 22 wherein the tungsten carbide particles comprise about 75 percent by weight carburized tungsten carbide particles having an average particle size of about 50 microns and about 25 percent by weight carburized tungsten carbide particles having an average particle size of about 20 microns.

24. A rock bit comprising:
   a rock bit body;
   at least one cutting cone rotatably mounted to an end of the body, wherein the cone includes a gage surface at a heel portion of the cone;
   a number of teeth on the cone, wherein the teeth include gage row teeth located near a heel of each cone, wherein the gage surface of the cone and at least an outer end of the gage row teeth include the rock bit hardfacing comprising:
      steel in the range of from 20 to 40 percent by weight; and
      tungsten carbide particles in the range of from 60 to 80 percent by weight, the tungsten carbide particles comprising:
         carburized tungsten carbide particles having an average particle size of about 50 microns; and
         carburized tungsten carbide particles having an average particle size of about 20 microns.

* * * * *